(12) United States Patent
Lee

(10) Patent No.: US 8,925,578 B2
(45) Date of Patent: Jan. 6, 2015

(54) APERTURE-SHAPED VARIABLE VALVE

(76) Inventor: Keun Sang Lee, Cheonan-si (KR)

( * ) Notice: Subject to any disclaimer, the term of this patent is extended or adjusted under 35 U.S.C. 154(b) by 891 days.

(21) Appl. No.: 13/061,512

(22) PCT Filed: Aug. 27, 2009

(86) PCT No.: PCT/KR2009/004781
§ 371 (c)(1),
(2), (4) Date: May 25, 2011

(87) PCT Pub. No.: WO2010/024600
PCT Pub. Date: Mar. 4, 2010

(65) Prior Publication Data
US 2011/0303864 A1 Dec. 15, 2011

(30) Foreign Application Priority Data
Aug. 29, 2008 (KR) .................. 10-2008-0085163

(51) Int. Cl.
*F16K 3/03* (2006.01)
*F16K 3/314* (2006.01)

(52) U.S. Cl.
CPC .. *F16K 3/03* (2013.01); *F16K 3/314* (2013.01)
USPC ............. 137/527; 138/45; 251/212; 251/337

(58) Field of Classification Search
USPC ............... 251/212, 337; 137/527; 138/45–46
See application file for complete search history.

(56) References Cited

U.S. PATENT DOCUMENTS

| 2,508,615 | A | * | 5/1950 | Lukes | 137/512 |
|---|---|---|---|---|---|
| 2,614,789 | A | * | 10/1952 | Labour | 251/212 |
| 2,634,578 | A | | 4/1953 | Karral | |
| 2,649,272 | A | * | 8/1953 | Barbato | 251/212 |
| 2,934,892 | A | * | 5/1960 | Hurlbert et al. | 239/265.39 |
| 2,956,582 | A | * | 10/1960 | Pranter | 137/512.1 |
| 3,787,022 | A | * | 1/1974 | Wilcox | 251/212 |
| 4,178,638 | A | * | 12/1979 | Meyer | 137/527 |
| 4,528,999 | A | * | 7/1985 | Tonellato | 137/70 |
| 4,635,269 | A | | 1/1987 | Reilly et al. | |
| 4,850,535 | A | | 7/1989 | Ivie | |
| 5,076,705 | A | * | 12/1991 | Brickhouse et al. | 137/527 |
| 5,101,855 | A | * | 4/1992 | Tammera | 251/212 |
| 5,340,291 | A | * | 8/1994 | Benckert et al. | 251/212 |
| 5,829,464 | A | | 11/1998 | Aalto et al. | |
| 6,971,631 | B1 | * | 12/2005 | Naughton | 251/212 |

FOREIGN PATENT DOCUMENTS

| JP | 61-185987 A | 8/1986 |
|---|---|---|
| JP | 06-034069 | 2/1994 |
| KP | 10-0857304 | 9/2008 |
| KR | 10-2006-0063067 | 6/2006 |
| KR | 10-0721683 | 5/2007 |

OTHER PUBLICATIONS

International Search Report for PCT/KR2009/004781 Mailed on April 15, 2010.

* cited by examiner

*Primary Examiner* — John Bastianelli
(74) *Attorney, Agent, or Firm* — Revolution IP, PLLC

(57) ABSTRACT

An aperture-shaped variable valve which is used for a semi-active control. The variable valve includes a ring-shaped aperture frame, a plurality of aperture plates which is arranged in a ring shape by overlapping each other on the aperture frame and forms an aperture, a restoring ring which fits into the outside of an aperture surface, and a spring which is connected between the restoring ring and the aperture frame.

1 Claim, 6 Drawing Sheets

APERTURE-SHAPED VARIABLE VALVE

Related Applications

This application is a 371 application of International Application No. PCT/KR2009/004781, filed Aug. 27, 2009, which in turn claims priority from Korean Patent Application Nos. 10-2008-0085163, filed Aug. 29, 2008, each of which is incorporated herein by reference in its entirety.

TECHNICAL FIELD

The present invention relates to a valve which controls a flow rate of fluid, and more particularly, to an aperture-shaped variable valve which is attached to the inside or end of a pipe to variably control the flow rate or pressure of fluid, such as liquid or gas, changing the flow rate at any time and flowing along the pipe.

BACKGROUND ART

Typical control valves including disc variable valves used for the purposes of controlling the flow rate hardly control the flow rate precisely since the location of the opening/closing part of the valves and the open area of the flow path are not linearly related. Also, the shape of the flow path inside the valve drastically changes to fluctuate the velocity and pressure of fluid to thereby cause a turbulent flow, resulting in great pressure loss, flow noise and vibration. If the fluid is liquid, a very low pressure is partially formed inside the fluid and the separated gas of the liquid generates cavitations. To control the typical valves as above, an additional motor is required to rotate the rotation part of the valves and the control system becomes complicated.

As to one usage of the variable valve, a disc variable valve which is used for an automotive exhaust system is attached to a first end of an exhaust pipe as shown in (a) in FIG. 1. Automotive muffler is used to reduce exhaust noise by gradually decreasing the pressure of exhaust gas since high temperature and high pressure pulsating exhaust gas causes great noise due to a drastic change in pressure if being emitted to the atmosphere as is. If the pressure of the exhaust gas emitted from the muffler ("back pressure") increases, the exhaust noise is reduced, but exhaust resistance increases and the engine power drops. By contrast, if the exhaust resistance is reduced to prevent the power loss of the engine, the exhaust noise aggravates. Accordingly, if the variable valve is attached to the exhaust gas discharger, back pressure increases in a low speed area where the exhaust noise is important, and decreases in the medium and high speed area where the engine power is important, to thereby solve the foregoing problem which arises in the design of the muffler.

As shown in (b) in FIG. 1, a valve plate of a conventional disc variable valve which is used for an automotive muffler is initially closed by a spring and open when back pressure rises to exceed the force of the spring with the flow rate increase. It is important to understand the correlation between the back pressure according to the flow rate and a spring constant to apply the variable valve to the muffler. However, in the case of a conventional disc variable valve, an opening area does not linearly increase according to an opening angle of the disc and it is very difficult to calculate the flow rate which is discharged through the opening area. Accordingly, a lot of tests should be conducted for diameters of exhaust pipes in which valves are attached with respect to various engines to identify the correlation between the back pressure and the spring constant, and each test formula should be found. Thus, it is not easy to manufacture an appropriate variable valve, and the common application of manufactured variable valves to other mufflers is limited.

In the case of the disc variable valve, opening the valve makes the flow path very complicated, and the flow of the fluid drastically changes, and causes noise and vibration due to a turbulent flow. To that respect, the variable valve may reduce the pulsating noise from the engine, but the flow noise from the variable valve increases, and the overall improvement for the exhaust noise is not that great or may become worse.

Conventional flowmeters which measure the flow rate through a differential pressure by using a ventury tube or nozzle has its cross sectional area fixed to measure the differential pressure, and are not appropriate for measuring a wide range of flow rates. If a wide range of flow rates should be measured, at least two flowmeters which have different ranges should be used simultaneously or sequentially measure the flow rate to overlap a part of the measurement range. In the former case, the flowmeters cannot be used adjacently in a desired location due to an interference of the flow. In the latter case, the adjustment of the overlapping range after the measurement is required and the flowmeters should be replaced.

To solve the problem of the typical control valve, the applicant filed application for "aperture-shaped active control variable valve" with Korean Patent Application No. 10-2007-0048965. This invention arranges a plurality of aperture plates in a ring shape on an aperture frame to have a semi-spherical or cone shape so that the valve is attached to the inside or end of the pipe in which fluid flows. The valve includes a means to apply a consistent force to an aperture surface including a plurality of aperture plates to control the exit diameter of the aperture and control the flow rate or pressure.

The present invention is an improved invention of Korean Patent Application No. 10-2007-0048965.

DETAILED DESCRIPTION OF EXEMPLARY EMBODIMENTS

Technical Problem

As described above, a control system which controls the flow rate or pressure by using conventional control valves hardly performs a linear control of the flow rate or pressure, and accompanies great pressure loss, flow noise and vibration and has a complicated configuration.

Accordingly, as a valve used for a flow rate control system, a variable valve is required to efficiently control the flow rate or pressure linearly, reduce pressure loss inside the valve, generate less flow noise and vibration, and enable a simpler control system.

The present invention relates to an active control and semi-active control flow rate valve which solves the foregoing technical problem.

Technical Solution

An aperture-shaped variable valve according to the present invention has a plurality of aperture plates arranged in a ring shape by overlapping each other on an aperture frame to form a semi-spherical or cone aperture surface. A hinge is formed in a front side of the valve in the aperture frame to maintain a predetermined entrance diameter, and a discharger is formed in an opposite direction of the aperture frame as a rear side of the valve to vary a diameter of an opening.

The aperture-shaped variable valve according to the present invention includes various shapes of control means to control the aperture surface formed by overlapping aperture plates, and a restoring means to recover the size of the discharger of the aperture if the control force applying to the aperture surface is released to thereby adjust the diameter of the discharger and control the flow rate or pressure of a pipe path in which the valve is installed.

Advantageous Effect

The aperture-shaped variable valve according to the present invention may control the flow rate or back pressure linearly and reduce the pressure loss and flow noise, compared to a conventional disc variable valve.

The aperture-shaped variable valve according to the present invention may be attached to the inside or end of the pipe to variably control the flow pressure of fluid changing the flow rate at any time and flowing along the pipe.

The aperture-shaped variable valve according to the present invention may use a simple actuator performing a rectilinear movement to adjust an opening area of the valve as the discharger area by various tools and methods and to easily form a flow rate or pressure control system.

MAJOR REFERENCE NUMERALS

10: aperture frame, 20: aperture plates, 30: restoring spring, 35: restoring means
35-1: elastic layer, 35-2: spring, 35-3: restoring ring, 35-4: guide
40: spring support, 50: control wire, 60: control ring, 70: control bar,
80: rear control ring

MODES FOR CARRYING OUT THE INVENTION

Figure 1:
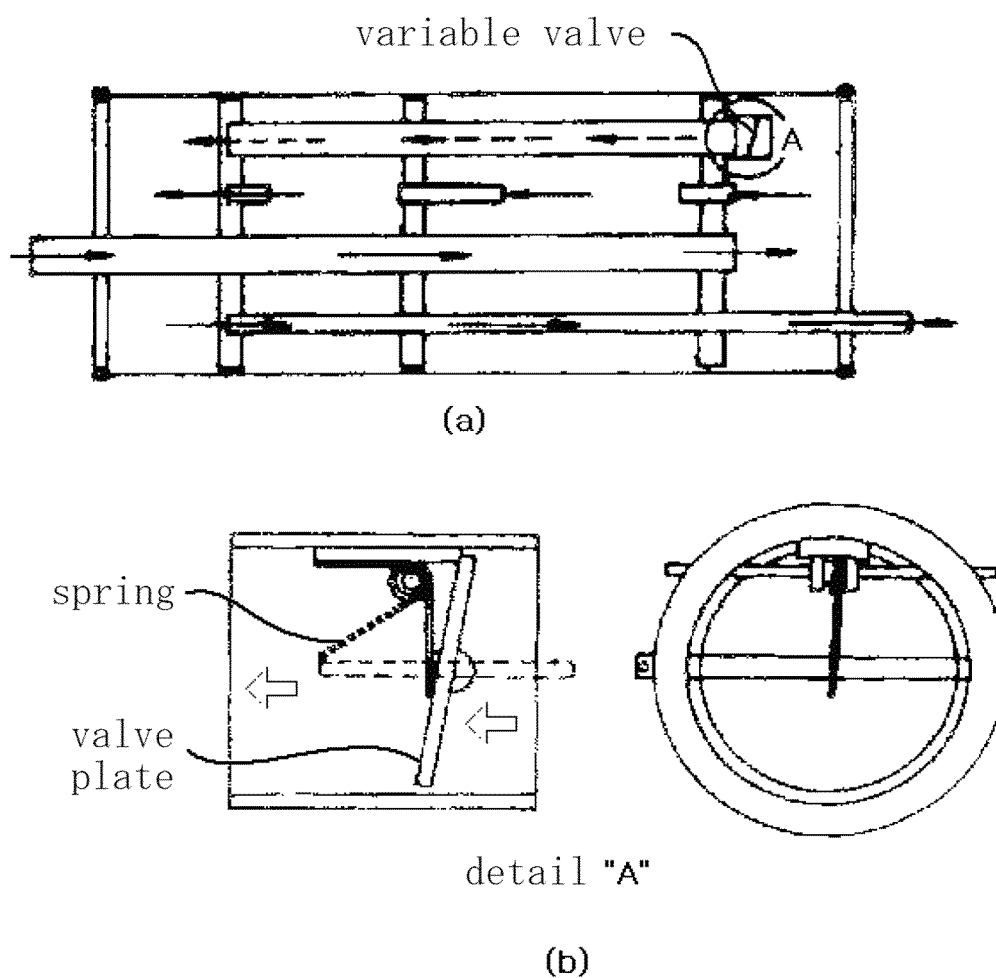
FIG. 1 illustrates a disc variable valve attached to a muffler and a general shape of the disc variable valve.
Figure 2:
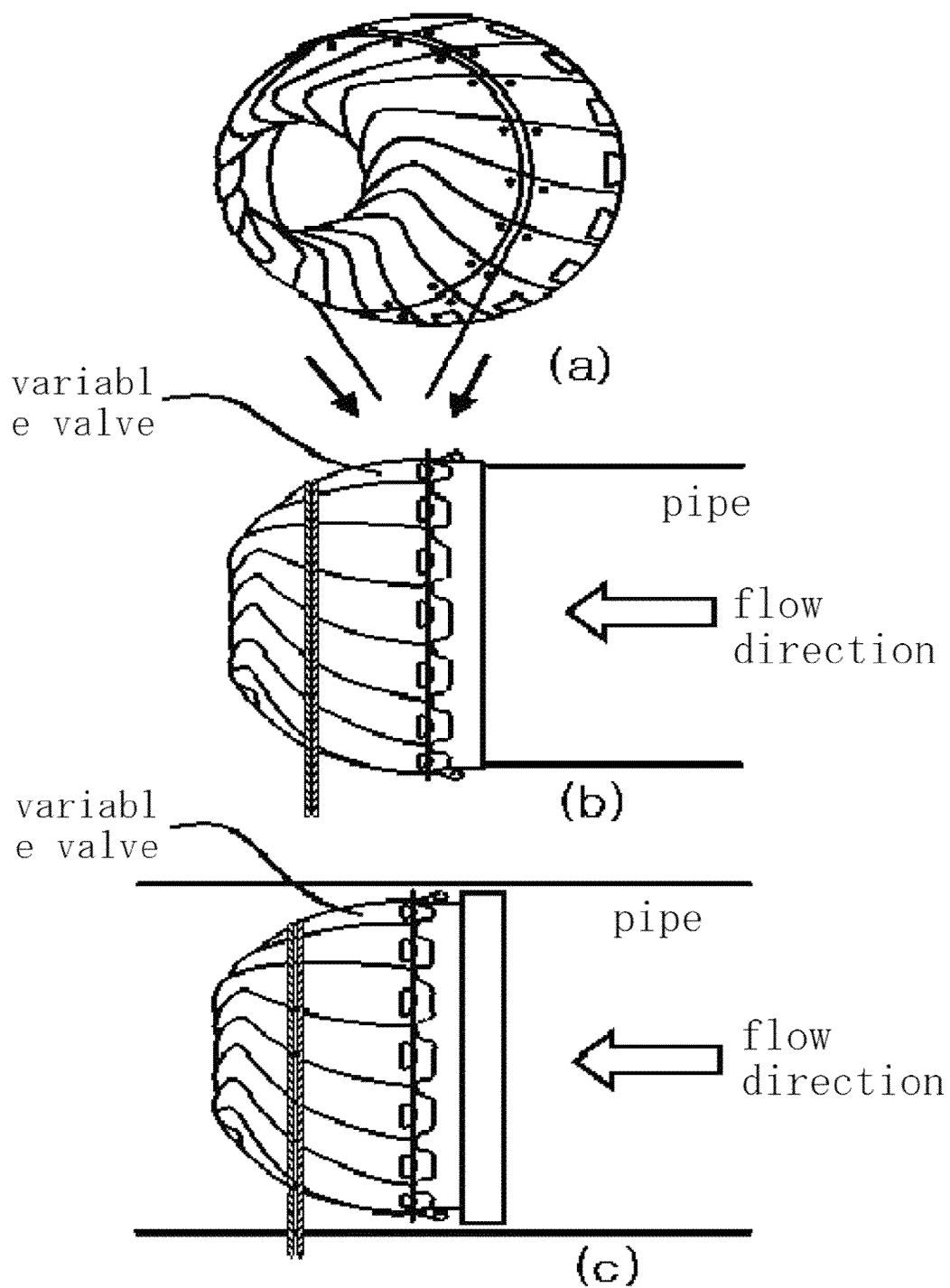
FIG. 2 illustrates a general shape of an aperture-shaped variable valve and the aperture-shaped) variable valve which is attached to a pipe.

An aperture-shaped variable valve according to the present invention is shaped as in (a) in FIG. 2, and may be attached to the end of a pipe which requires a flow rate control as in (b) in FIG. 2 or inside the pipe as in (c) in FIG. 2.

Figure 3:
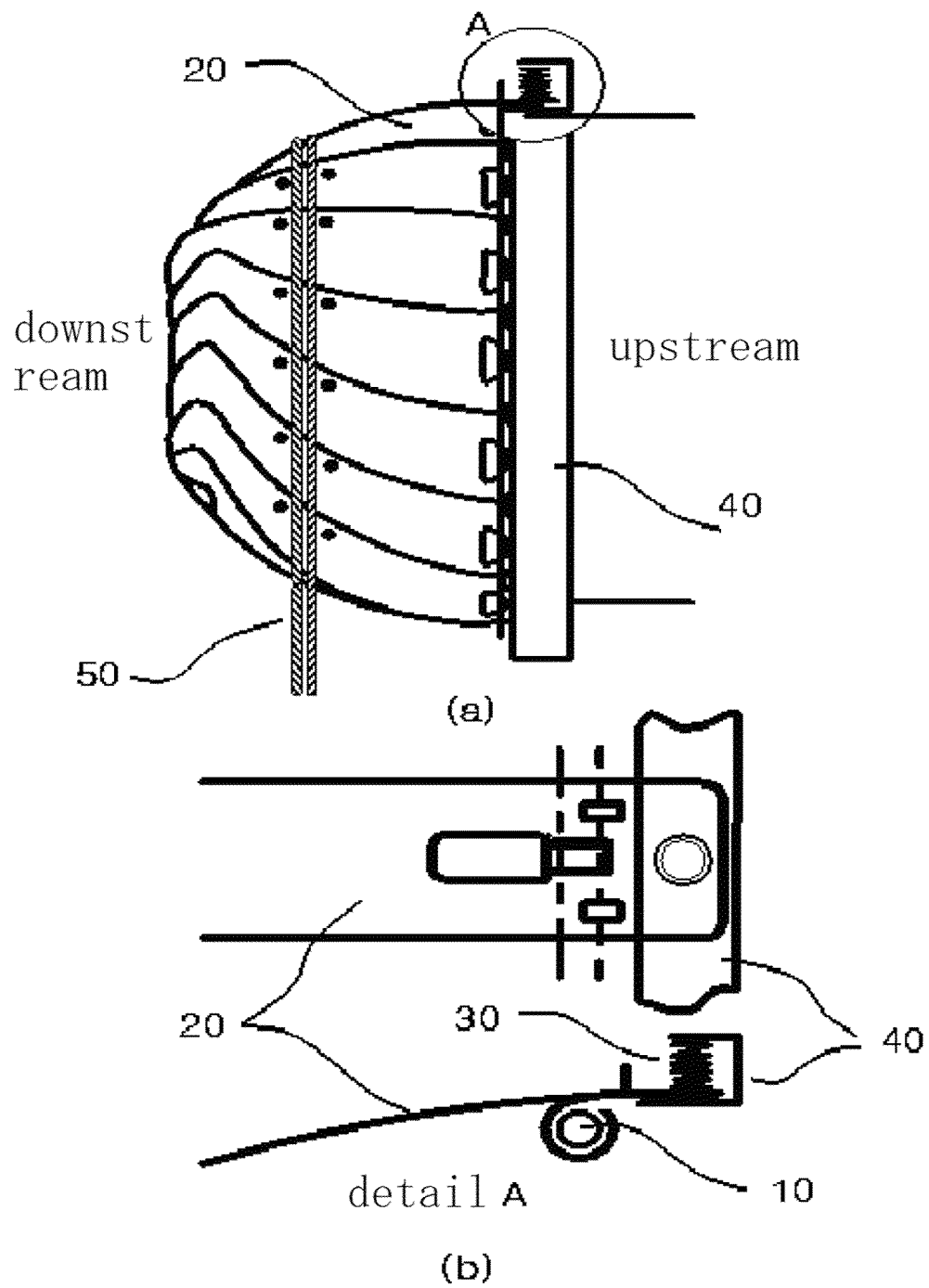
FIG. 3 illustrates an aperture-shaped variable valve which includes a control wire.

As shown in (a) in FIG. 3, an active control aperture-shaped variable valve which actively controls the flow rate and pressure of fluid flowing along the pipe by controlling an opening area of the valve (a control valve having the above function is called "active control valve," which applies to this specification) includes a ring-shaped aperture frame 10, a plurality of aperture plates 20 which is arranged in a ring shape on an aperture frame to form an aperture, a restoring spring which is attached to the aperture plates and supplies the restoring force to the aperture plates, a spring support 40 which fixes the restoring spring 30, and a control device 50 which controls the opening area of the aperture formed by the plurality of aperture plates 20.

Figure 8:
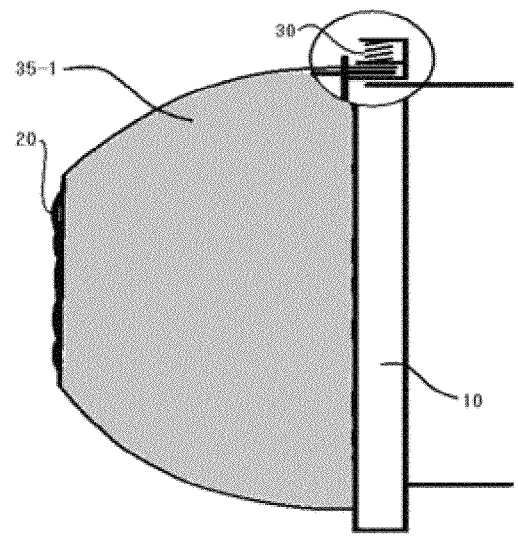
FIG. 8 illustrates an aperture-shaped variable valve which includes an elastic layer.
Figure 9:
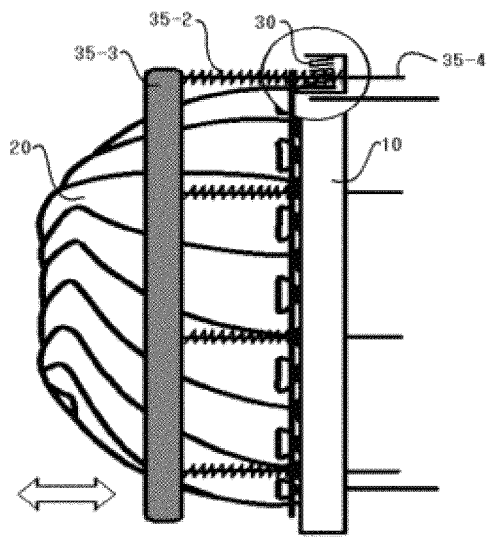
FIG. 9 illustrates an aperture-shaped variable valve which includes a restoring ring.

As shown in FIGS. 8 and 9, a semi-active control aperture-shaped variable valve which passively changes an opening area of the valve depending on the extent of the pressure of the fluid flowing along the pipe with respect to an aperture surface (a control valve having the above function is called "semi-active control valve," which applies to this specification) includes an aperture frame 10, aperture plates 20 and a restoring means provided in the outside of the aperture surface formed by the aperture plates 20 like the active control aperture-shaped variable valve.

The aperture frame 10 is provided in an upstream of the valve and may be manufactured in a ring shape by using a bar whose cross section is a circle so that the aperture plates 20 fit thereinto and rotate.

Figure 4:
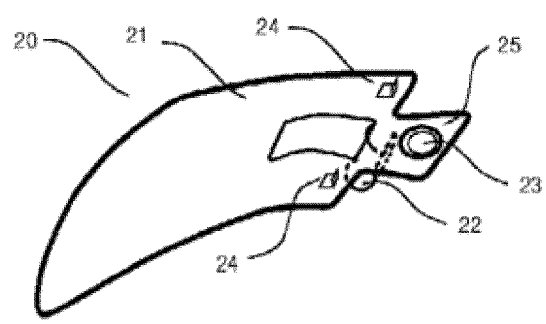
FIG. 4 illustrates an aperture plate which includes an aperture surface of the aperture-shaped variable valve.

As shown in FIG. 4, the aperture plates 20 include thin metal plates or plastic plates, and are manufactured by forming a hinge hole 22 coupled to the aperture frame 10 in a first end of an aperture plate body 21 shaped like a curved surface forming a part of a spherical, oval (a sphere whose cross section is oval like a rugby ball) or cone surface. A rear support 25 extends from the hinge hole 22 to be coupled to the restoring spring 30. A spring seat 23 is formed in the rear support 25. Gap adjustment pieces 24 are formed in opposite ends of the rear side of the aperture plate body 21.

The aperture frame 10 may be manufactured as a washer type ring having a large diameter and a narrow width instead of using a ring bar whose cross section is a circular shape. In this case, a plurality of slits may be formed in the ring to insert the rear support 25 of the aperture plates 20 thereinto. Then, the slits of the aperture frame 10 act as a hinge, and the aperture plates 20 which are inserted into the slits do not move along a circumferential direction of the aperture frame 10, which does not require additional gap adjustment pieces 24 for the aperture plates 20.

If the aperture plates 20 are manufactured by metal plates such as stainless steel, the metal plate is cut by press and the part of the plate is cut and folded to form the hinge hole 22 and the gap adjustment pieces 24.

The aperture plates 20 are fit so that the gap adjustment pieces 24 of the aperture plates 20 contact each other along the circumference of the aperture frame 10, and form a semi-spherical, semi-oval or cone-shaped aperture having a discharger in a downstream thereof.

The restoring spring 30 is fixed between the spring seat 23 formed in the rear side of the aperture plates 20 and the spring support 40. The restoring spring 30 is coupled to each of the aperture plates 20 and applies the force to the aperture plates 20 in the opening direction of the aperture.

The restoring spring 30 includes a compressed coil spring which always presses the rear support 25 of the aperture plates 20.

The restoring spring 30 may further include a torsional spring or a clip spring which has a first end fixed to the aperture frame 10 and a second end contacting the aperture plates 20 and allows the aperture formed by the aperture plates 20 to maintain an opening state. The torsional spring or clip spring may be coupled to the spring seat 23 formed by cutting a part of the hinge hole 22 of the aperture plates 20 and inserted into the aperture frame 10 together with the aperture plates 20. Then, the spring support 40 may be omitted and a simpler control system may be provided.

The spring support 40 has a aperture ⊂-shaped ring and is fixed to the pipe which employs the valve according to the present invention. The spring support 40 may be separately manufactured and coupled to the aperture frame 10 or may be integrally formed in the aperture frame 10.

The restoring spring 30 may vary by specially designing a connection of the spring support 40 and the aperture plates 20 other than the restoring spring as above.

The control device 50 reduces or enlarges the area of the discharger of the aperture by applying the force to the aperture surface formed by overlapping a plurality of aperture plates 20, and may vary.

As shown in FIG. 3, the control device 50 according to an exemplary embodiment may include a control wire 50 which is installed in the middle of the body of the aperture. A first end of the control wire 50 may be fixed and a second end thereof may be connected to an actuator which pulls and releases the control wire 50. If the control wire 50 is pulled, the aperture plates 20 overcome the force of the restoring spring 30 and reduce the discharger of the aperture. If the control wire 50 is released, the restoring spring 30 of the aperture plates 20 applies the force to the aperture plates 20 and extends the discharger.

In the active control variable valve which uses the control wire 50 as above, a semi-active control variable valve may be formed by connecting the first end of the control wire 50 to a fixed control spring (not shown), instead of connecting the first end of the control wire 50 to the actuator. That is, if the pressure of the fluid flowing along the pipe increases and a reaction force of the inside of the aperture exceeds the force of the control spring connected to the control wire 50 controlling the aperture surface, the control spring extends and the control wire 50 is released to extend the discharger of the aperture. If the flow pressure decreases and the reaction force inside the aperture becomes smaller than the force of the control spring, the control wire 50 returns to its original location and reduces the discharger by the restoring elastic force of the control spring. That is, the rising pressure of the fluid flowing along the pipe extends the discharger and the pressure is reduced. If the pressure of the fluid flowing along the pipe decreases, the discharger is reduced and the pressure increases to thereby control the flow pressure semi-actively.

If a bypass pipe is connected to an entrance of the pipe in which the variable valve is attached, a rising flow pressure opens the discharger and the fluid flows to the pipe having the variable valve installed therein, and the flow rate inside the bypass pipe decreases. If the flow pressure decreases, the flow rate increases again. The flow rate and the flow pressure are interdependent and may be controlled at the same time. Even in such a case, the valve according to the present invention may control the flow rate and pressure individually or collectively.

The difference between the active control and the semi-active control is as follows: In the case of the active control, the control device actively operates by an external force instead of the pressure of the fluid, and an artificial control is available after the valve is attached to the pipe. In the case of the semi-active control, the aperture plates or the control device operates by the pressure of the fluid only, and an artificial control is not available after the valve is attached to the pipe.

Figure 5:
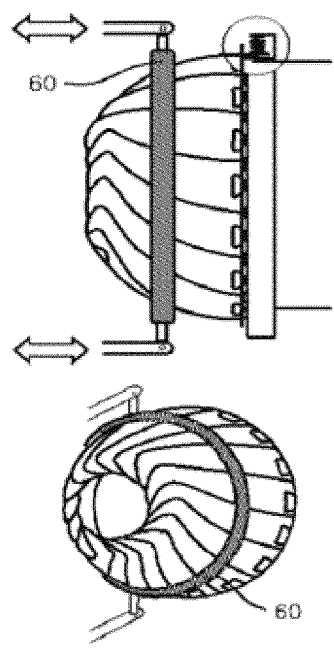
FIG. 5 illustrates an aperture-shaped variable valve which includes a control ring.

As shown in FIG. 5, a control device according to another exemplary embodiment employs a control ring 60 which moves to the upstream or downstream along a central axis of the variable valve. If the control ring 60 moves to the upstream whose diameter is larger than the downstream, the aperture plates 20 of the aperture overcome the force of the restoring spring 30 and reduce the discharger of the aperture. If the control ring 60 moves to the downstream whose diameter is smaller than the upstream, the restoring spring 30 of the aperture plates 20 applies the force to the aperture plates 20 to extend the discharger.

In the active control valve which uses the control ring 60 as above, a semi-active control variable valve may be formed by installing a control spring (not shown) applying a consistent force to the upstream of the valve instead of fixing the control ring 60 to the actuator. That is, if the pressure of the fluid flowing along the pipe increases and the reaction force inside the aperture exceeds the force of the control spring connected to the control ring 60 controlling the aperture surface, the control spring extends or compresses and moves to the downstream and extends the discharger of the aperture. If the flow pressure decreases and the reaction force inside the aperture becomes smaller than the force of the control spring, the control ring 60 returns to its original position and the discharger is reduced by the restoring elastic force of the control spring.

Figure 6:
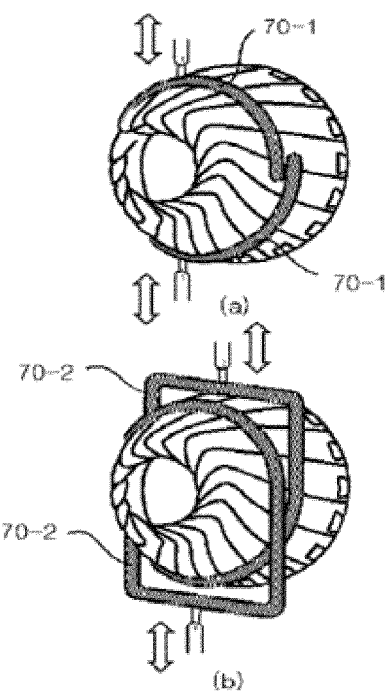
FIG. 6 illustrates an aperture-shaped variable valve which includes a control bar.

As shown in (a) in FIG. 6, a control device according to another exemplary embodiment may be provided by installing a control bar 70-1 in the middle of the aperture. An end of the control bar 70-1 is shaped like a circular arc to surround the aperture. If opposite ends of the control bar 70-1 are pressed, the aperture plates 20 overcome the force of the restoring spring 30 and reduces the discharger of the aperture. If the force pressing the control bar 70-1 is removed, the restoring spring 30 applies the force to the aperture plates and extends the discharger. If the aperture plates are pressed by the control bar 70-1, the upper and lower aperture plates of the aperture are pressed directly, but the pressure is transmitted to other adjacent aperture plates as the aperture plates 20 overlap each. Thus, all of aperture plates move and reduce the discharger.

Instead of pressing the opposite ends of the control bar 70-1, a control bar 70-2 whose opposite ends are pulled may be provided as shown in (b) in FIG. 6.

In the active control valve which uses the control bar 70-1 or 70-2, a semi-active control variable valve may be provided by installing a control spring (not shown) pressing or pulling the control bar 70-1 or 70-2 instead of fixing the control bar 70 to the actuator. That is, if the pressure of the fluid flowing along the pipe increases and the reaction force inside the aperture exceeds the force of the control spring connected to the control bar 70-1 or 70-2 controlling the aperture surface, the control spring extends or compresses and the control bar 70-1 or 70-2 are pulled or pressed upwards/downwards to extend the discharger of the aperture. If the pressure of the fluid decreases and the reaction force inside the aperture becomes smaller than the force of the control spring, the control bar 70-1 or 70-2 return to their original position and reduce the discharger by the restoring elastic force of the control spring.

Figure 7:
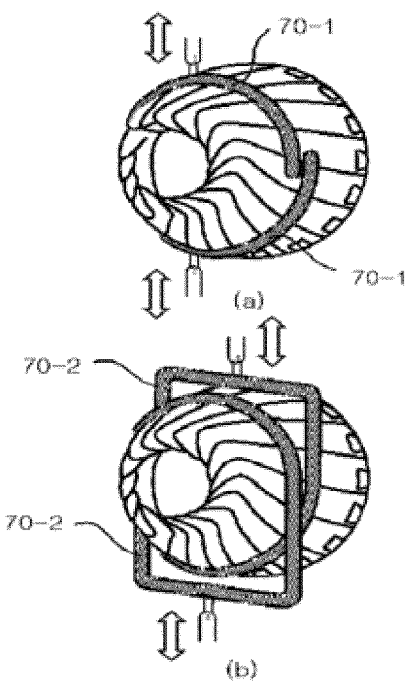
FIG. 7 illustrates an aperture-shaped variable valve which includes a rear control ring and is installed to the pipe.

As shown in FIG. 7, a control device according to another exemplary embodiment may extend the rear side of the aperture plates 20, employ a rear control ring 80 in the rear side of the valve, and move the rear control ring 80 to the upstream or downstream along a central axis of the variable valve. If the rear control ring 80 moves to the downstream, the aperture plates 20 of the aperture overcome the force of the restoring spring 30 and reduce the discharger of the aperture. If the rear control ring 80 moves to the upstream, the restoring spring 30 of the aperture plates 20 applies the force to the aperture plates 20 to extend the discharger.

In the active control valve which uses the rear control ring 80 as above, a semi-active control valve may be provided by installing a control spring (not shown) applying the force toward the downstream of the valve instead of fixing the rear control ring 80 to the actuator. That is, if the pressure of the fluid flowing along the pipe increases and the reaction force inside the aperture exceeds the force of the control spring connected to the rear control ring 80 controlling the aperture surface, the control spring extends or compress and the rear control ring 80 moves to the upstream and extends the discharger of the aperture. If the pressure of the fluid decreases and the reaction force inside the aperture becomes smaller than the force of the control spring, the rear control ring 80 returns to its original position and reduces the discharger by the restoring elastic force of the control spring.

As shown in FIG. 8 or 9, a semi-active control aperture-shaped variable valve is provided by installing a restoring means outside the aperture surface, excluding the control device 50, 60, 70 or 80 from the active control aperture-shaped variable valve. If the restoring spring 30 is not used, the valve becomes a variable valve whose discharger is completely closed when there is no pressure to the aperture surface. If the restoring spring 30 is used, the valve becomes a variable valve whose discharger has a minimum area when the force of the restoring spring to open the aperture and the force of the restoring means to close the aperture are equal.

As shown in FIG. 8, the restoring means according to an exemplary embodiment may include an elastic layer 35-1. The elastic layer 35-1 may be manufactured with a rubber layer to surround the external surface of the aperture and be fixed to the aperture frame 10.

The elastic layer 35-1 has the discharger of the aperture maintain its reduced size and extends the discharger of the aperture if the inside of the aperture receives the reaction force by the pressure of the fluid flowing along the pipe. If the pressure of the fluid decreases, the elastic layer 35-1 contracts and the discharger of the aperture is reduced.

That is, if the pressure of the fluid flowing along the pipe increases, the discharger extends and the pressure of the fluid decreases. If the pressure of the fluid flowing along the pipe decreases, the discharger is reduced and the pressure of the fluid increases to thereby control the pressure of the fluid semi-actively.

If the elastic layer 35-1 is used as a restoring means, it acts as a restoring spring and concurrently prevents the fluid from leaking between the aperture plates to thereby control the flow rate and pressure more precisely.

As shown in FIG. 9, a restoring means according to another exemplary embodiment may include a spring 35-2 and a restoring ring 35-3. The restoring ring 35-3 fits into the outside of the aperture surface and is connected to the aperture frame 10 by the spring 35-2.

The restoring ring 35-3 is pulled to the front side of the valve by the spring 35-2 to reduce the discharger of the aperture, and then overcomes the tension of the spring 35-2 and moves to the discharger of the aperture, and expand the discharger of the aperture as the inside of the aperture is affected by the pressure of the fluid flowing along the pipe to extend the aperture. If the pressure of the fluid decreases, the spring 35-2 compresses and pulls the restoring ring 35-3 to the front side of the valve and reduces the discharger of the aperture.

If the spring 35-2 includes a guide 35-4 therein, it extends and compresses on an axial line in the direction of the guide 35-4 and ensures a more stable movement of the restoring ring 35-3. The guide 35-4 is generally provided inside the spring 35-2, but not limited thereto. Alternatively, the guide 35-4 may surround the outside the spring 35-2 and is applicable to all of restoring elastic members of the control device.

The semi-active control aperture-shaped variable valve which employs the restoring ring 35-3 should be installed in a place where the inclination of the aperture surface is predetermined or more so that the restoring ring slides along the surface of the aperture plates and moves backward while the aperture plates 20 are unfolded. To decrease the coefficient of friction between the restoring ring 35-3 and the aperture surface, a lubricant may be applied between the restoring ring 35-3 and the aperture surface, or a bearing may be installed inside the restoring ring 35-3.

If the temperature of the fluid is not high and the fluid does not corrode rubber, the restoring spring may include raw rubber or synthetic rubber instead of a metal spring. Instead of the spring, a permanent magnet or an electromagnet may be used to generate the restoring force by the attraction or repulsion of the magnet.

Industrial Applicability

An aperture-shaped control valve according to the present invention may be used to control an automotive exhaust noise by variably controlling the back pressure of the automotive exhaust system where the flow rate of the exhaust gas varies depending on the RPM of the engine.

If the aperture-shaped control valve according to the present invention is used in a flowmeter, a cross section may vary depending on the range of measurement of the flow rate and a wide range of flow rates may be measured by a single flowmeter.

If the aperture-shaped control valve according to the present invention is used in a rocket propellant or rocket which receives a propellant force by emission of combustion gas, the quantity and pressure of the emitted combustion gas may be easily controlled.

The invention claimed is:

1. An aperture-shaped variable valve which is used for a semi-active control, the variable valve comprising:
   a ring-shaped aperture frame;
   a plurality of aperture plates which are arranged in a ring shape by overlapping each other on the aperture frame and form an aperture;
   a restoring ring which fits onto the outside of an aperture surface formed by the aperture plates; and
   a spring which is connected between the restoring ring and the aperture frame.

* * * * *